UNITED STATES PATENT OFFICE.

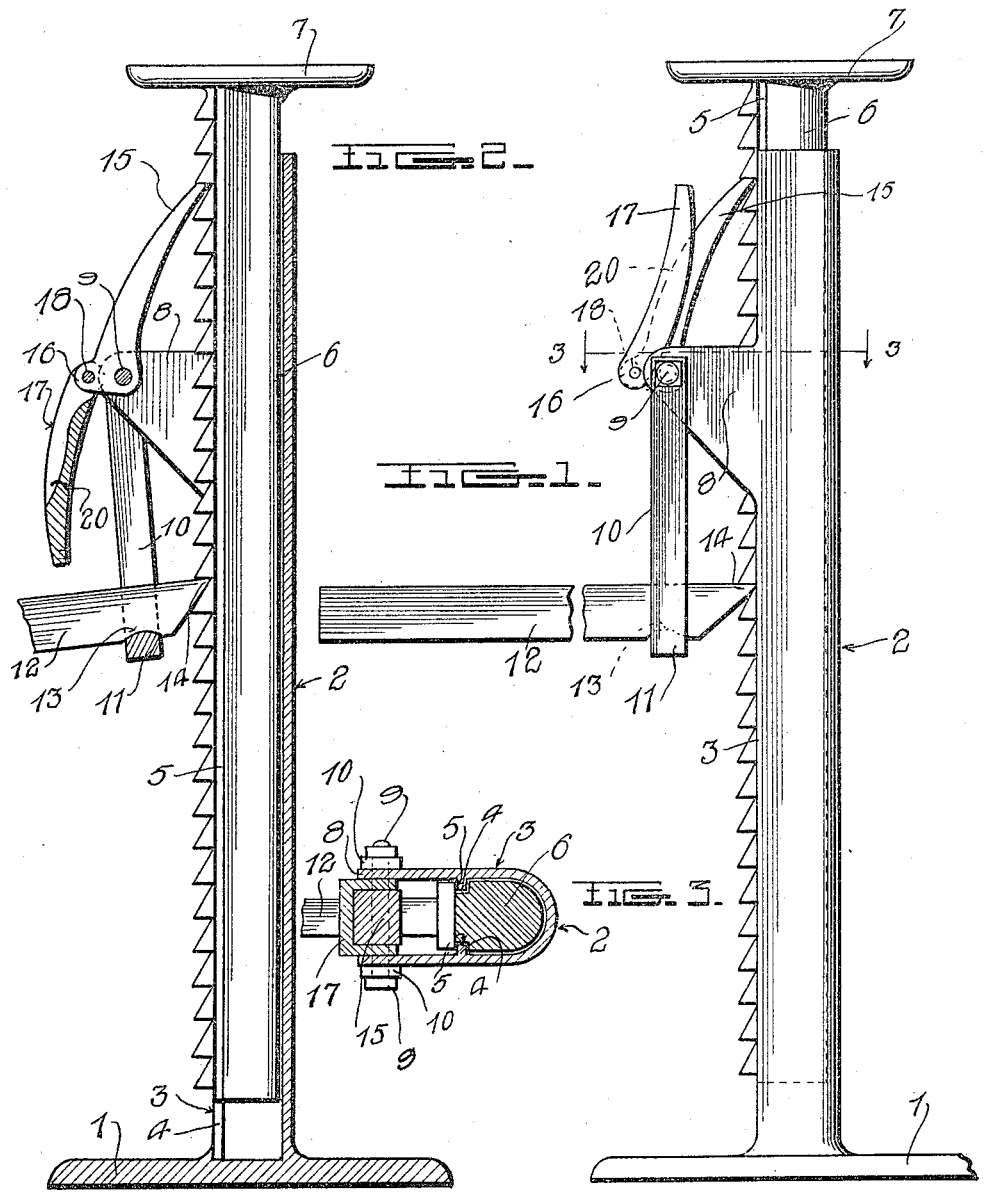

FRANK H. CHOATE, OF GREENVILLE, OHIO.

JACK.

1,223,561.  Specification of Letters Patent. Patented Apr. 24, 1917.

Application filed March 17, 1916. Serial No. 84,937.

*To all whom it may concern:*

Be it known that I, FRANK H. CHOATE, a citizen of the United States, residing at Greenville, in the county of Darke and State of Ohio, have invented certain new and useful Improvements in Jacks; and I do declare the following to be a full, clear, and exact description of the invention, such as will enable others skilled in the art to which it appertains to make and use the same.

My invention which relates to improvements in jacks such as those used for hoisting automobiles, has for its object to provide a simply constructed and inexpensive device of this class which will operate to advantage for either raising or lowering a vehicle or the like.

With this general object in view, the invention resides in certain novel features of construction and in unique combinations of parts to be hereinafter fully described and claimed, the descriptive matter being supplemented by the accompanying drawing which constitutes a part of this application and in which:

Figure 1 is a side elevation of the improved jack showing the parts thereof in position for raising a vehicle;

Fig. 2 is a vertical sectional view showing the relation of parts for lowering said vehicle; and Fig. 3 is a detail horizontal section taken on the plane indicated by the lines 3—3 of Fig. 1.

In specifically describing the construction shown in the drawings above briefly described, similar characters will be placed on corresponding parts throughout the several views and reference will be herein made to the numerous elements by their respective indices. To this end, the numeral 1 indicates an appropriate base from which a support 2 rises, said support being in the form of a channel-shaped standard having the free edges of its side flanges 3 bent inwardly as shown at 4 and received in vertical grooves 5 formed in opposite sides of a toothed shank 6 mounted for vertical movement in the aforesaid standard. As is usual with devices of this class, the upper end of the shank 6 is provided with a rest 7 adapted to support thereon the object to be raised or lowered as the case may be.

Projecting from and formed integrally with the free edges of the flanges 3, is a pair of angular brackets 8 through whose outer ends a transverse pivot pin 9 passes, the opposite ends of this pin being also passed through the ends of a U-shaped hanger 10 whose yoke 11 is preferably rounded on its upper side, said yoke serving as a fulcrum for a hand lever 12 having a seat 13 near its front end resting removably on said yoke. The front end of the lever 12 is pointed as disclosed at 14 for engagement with the teeth of the shank 6, whereby said shank may be moved vertically by proper actuation of the lever.

For holding the shank 6 against downward movement after being adjusted by the lever 12, a dog 15 is pivoted at its lower end upon the pin 9 between the brackets 8, the upper end of said dog coöperating with the teeth of the shank as shown clearly in Fig. 1. The lower end of the dog 15 is provided with an integral laterally extending lug 16 disposed to one side of the pin 9, and to this lug the lower end of a triple-acting elongated weight or dog controlling finger 17 is pivoted upon an axis 18 lying parallel to the aforesaid pin 9. The finger 17 is channeled longitudinally in one side as indicated at 20, whereby it may be moved upwardly to the position shown in Fig. 1 and may receive the back of the dog 15 in its channel. With the parts in this position, the weight of the finger 17 assists in moving the dog 15 to operative position in respect to the teeth of the shank 6. Thus, after each raising stroke of the lever 12 the dog 15 will hold the shank 6 in its vertically adjusted position. Obviously, this takes place successively after each raising thrust of the lever 12 and in this manner allows the load to be raised and supported quickly and easily.

When the load is to be lowered, the finger 17 is swung downwardly to the position disclosed in Fig. 2, in which position its weight will disengage the dog 15 from the teeth of the shank when the friction existing between these parts is overcome by depression of the lever 12 to raise said shank slightly. By now raising the lever 12, the bar 6 and the weight supported thereon will lower, but as said lever rises, it abuts the lower end of the finger 17 and by so doing again throws the dog 15 into operative relation with the teeth of the shank. This operation will take place successively until the load is lowered the necessary amount, it being understood that when either lowering or raising a load, it is necessary to adjust the end 14 of the lever into engagement with different teeth after each stroke of said lever.

By constructing the jack in the manner described, it will be obvious that it will operate to great advantage and will be an efficient tool, it being particularly designed for use in connection with automobiles since the hand lever 12 may be easily removed and used as a tire removing tool or in any other ways which occasion may demand.

I have applied the term triple-acting to the finger 17 since it has a three-fold function. When a load is being elevated by the jack and the finger 17 is located as shown in Fig. 1, it serves to retain the dog 15 in operative relation with the teeth of the shank 6; when a load is being lowered, at the starting of the lowering operation, that is, when the lever 12 is depressed sufficiently to avoid friction between the dog 15 and the teeth of the shank, the weight of the finger 17 will retract said dog 15, if said finger be in the position shown in Fig. 2; and as the load is now lowered and the lever 12 rises, the finger 17 is struck by said lever and thus again applies the dog 15 to operative position. This triple action of the finger 17 or an equivalent member is considered the most salient feature of the invention.

In the foregoing, certain specific details of construction have been described for accomplishing probably the best results and in the accompanying drawing, such details have been illustrated. It is to be understood, however, that numerous changes may be made within the scope of the invention as claimed without sacrificing the main advantages thereof.

I claim:—

1. A jack comprising a hollow standard, a bracket extending laterally from the upper end thereof, a shank movable vertically in said standard, a vertically oscillating lever below the bracket for raising and lowering the shank, a substantially upright dog pivoted at its lower end to the aforesaid bracket and coöperating at its upper end with the shank to retain the latter in adjusted position, and a dog controlling finger pivoted to said dog to one side of its pivot, said finger being adapted to be swung upwardly into contact with the back of the dog to force the latter into operative relation with the shank at the end of each raising stroke of the lever, said finger being also adapted to be swung downwardly and thereby serving to retract the dog upon each lowering stroke of the lever, said finger when in the last named position being disposed in the upward path of the lever, whereby it will be struck by the latter to again apply the dog at the end of each lowering stroke of said lever.

2. A jack comprising a shank, a vertically oscillating lever for raising and lowering the same, a pivoted dog above the lever for holding the shank in adjusted position, and an elongated weight pivoted at one end to said dog to one side of its pivot and capable of either resting on said dog or depending therefrom to either apply or release said dog, said weight when depending from the dog being in the upward path of the lever to again apply said dog after releasing it.

3. A jack comprising a vertically movable shank, a vertically oscillating lever for raising and lowering said shank, a dog above said lever for holding said shank in adjusted position, and a finger pivoted to said dog to one side of its pivot, said finger being capable of depending from the dog into the upward path of the lever and being also capable of resting on said dog.

In testimony whereof I have hereunto set my hand in presence of two subscribing witnesses.

FRANK H. CHOATE.

Witnesses:
H. F. DERSHEM,
H. M. DERSHEM.

Copies of this patent may be obtained for five cents each, by addressing the "Commissioner of Patents, Washington, D. C."